United States Patent Office 3,126,072
Patented Mar. 24, 1964

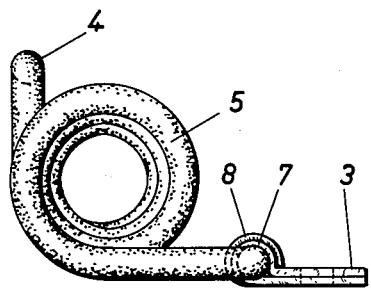
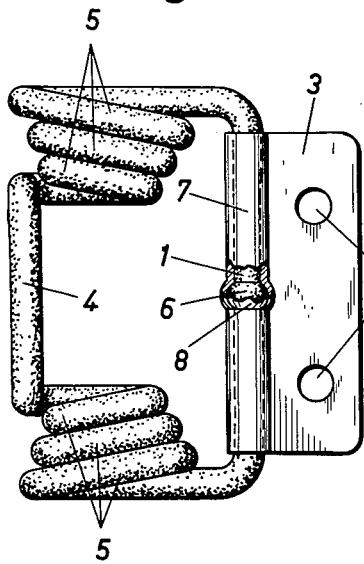
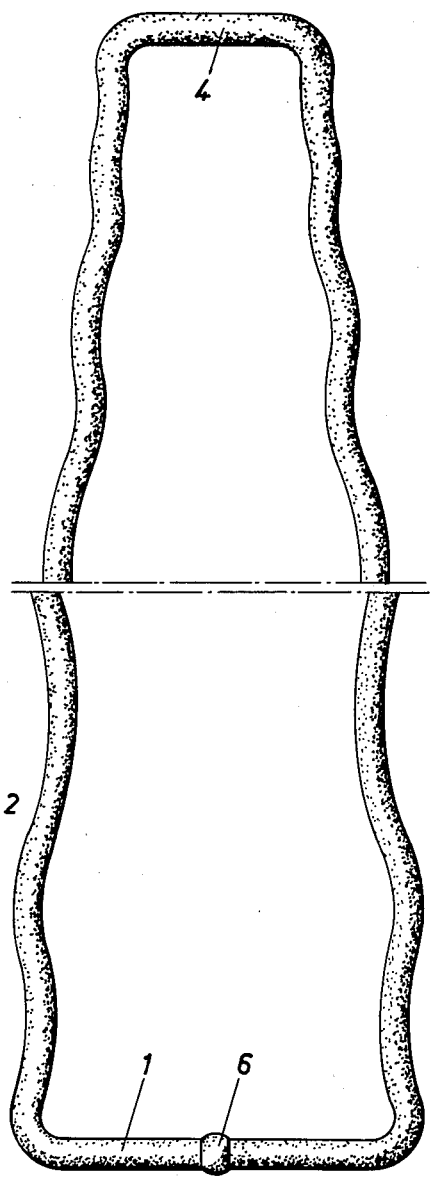

3,126,072
ENERGY ABSORBING DEVICES FOR USE WITH
A SAFETY BELT OR THE LIKE
Ebbe Anders Israel Johansson, 6 Kaptensgaten,
Halmstad, Sweden
Filed June 11, 1962, Ser. No. 201,377
Claims priority, application Sweden June 20, 1961
3 Claims. (Cl. 188—1)

The present invention relates to energy absorbing devices comprising a coiled metal rod or the like (e.g. of iron). The object of the invention is to provide an energy absorbing device of this kind which is particularly suitable for combining with a safety belt or the like, especially an extensible safety belt.

The energy absorbing device according to the invention is characterised in that it comprises two coiled portions which are connected with one another at one end and with an attachment member, and at the other end connected with one another and having a portion to which the safety belt or the like is intended to be secured.

According to a preferred embodiment of the invention, the geometrical axes of the coiled portions are perpendicular to the direction of the stretching strain for which the device is intended, said coils preferably being disposed with said axes substantially coinciding.

One embodiment of the invention is illustrated in the accompanying drawing wherein:

FIGURES 1 and 2 are two side elevations at right angles to each other of a device according to the invention; and FIGURE 3 is a partly broken plan view of the energy absorbing device in extended state after it has been subjected to a stretching strain which has distorted the shape of the device.

The energy absorbing device shown in the drawing is made of a round iron or the like rod which has been bent into mainly the shape of a closed frame to one side member 1 of which there is connected an attachment member 3 provided with holes 2 for securing the device in, for instance, a vehicle. The safety belt or the like which is to be used together with the energy absorbing device is intended to be connected by one of its ends to the opposite side member 4 of the frame-like device. In each of the remaining, oppositely disposed, sides of the frame the rod is bent into the form of two coils 5 which are coaxial with one another with their common axis parallel with the frame sides 1 and 4. The two coiled portions 5 are wound in opposite directions with the coil turns increasing in diameter from the inner to the outer convolution.

The ends of the closed frame formed by the rod are connected together by means of a welding seam 6 located centrally in the side member 1. In the embodiment shown the attachment member 3 is made from a plate which has a sleeve-shaped portion 7 bent around the frame side 1. The sleeve-shaped portion 7 is provided with a central enlargement 8 for receiving the enlargement of the frame side which is formed by the welding seam 6. In this manner lateral location of the attachment member 3 on the frame side 1 is obtained in a simple way. From the foregoing it will be noted that the closed frame with its two coiled parts 1, 4, 5, and the attachment member, are inseparably combined as a unitary article.

As will appear, especially from FIGURE 1, that end of the energy absorbing device which is provided with the frame side 4 is bent at an angle to the end portion containing the opposite frame side 1. The angle between these two portions as well as the length of that portion which is terminated by the frame side 4 may be varied as desired in order to vary the initial resistance of the energy absorbing device to a stretching strain in a direction at right angles to the portions 1 and 4. The resistance presented by the energy absorbing device at various loads may easily be varied by making the coiled portions 5 with a larger or smaller number of convolutions and by varying the diameter of the same. It is of course possible also to vary the cross-sectional area of the rod forming the frame and to vary the metal of the rod. In combination with a safety belt the energy absorbing device may be so designed that the total elongation of both the belt and the energy absorbing device occurs in such a way that a person secured to the seat by means of the safety belt will be subjected to the least stresses possible upon a sudden braking of the movement of the vehicle.

When the energy absorbing device is subjected to a stress in the form of a pull on the end portion 4 which is connected to the safety belt or the like the coiled portions 5 will be straightened out whereat, simultaneously, the rod will be twisted around its axis so that the straightened-out device will become shaped substantially as illustrated in FIGURE 3.

The invention is not limited to the embodiment hereinbefore described and as shown in the accompanying drawing, said embodiment being susceptible to various modifications with respect to its details without departing from the spirit of the invention as defined by the appended claims.

What I claim is:

1. An energy absorbing device for use with a safety belt comprising a metal rod having an intermediate portion for being secured to the safety belt, a pair of coiled portions contiguous with said intermediate portion and end portions connected together and an attachment member connected to said end portions.

2. An energy absorbing device for use with a safety belt as claimed in claim 1 wherein said coiled portions have geometrical axes perpendicular to the direction of the strain on the safety belt at its point of attachment and said axes substantially coinciding.

3. An energy absorbing device for use with a safety belt as claimed in claim 1 wherein said attachment member comprises a sleeve-shaped portion with said rod ends positioned therein, said sleeve-shaped portion having an enlarged portion and said rod ends being connected by a welding seam having a larger diameter than said rod and said seam being positioned in said sleeve-shaped portion enlarged portion.

References Cited in the file of this patent

UNITED STATES PATENTS

| | | |
|---|---|---|
| 708,242 | Mosely | Sept. 2, 1902 |
| 2,161,820 | Kessenich | June 13, 1939 |
| 2,227,717 | Jones | Jan. 7, 1941 |
| 2,848,250 | Sheren | Aug. 19, 1958 |